(No Model.)
B. B. GEORGIA.
FEED TROUGH.
No. 462,251. Patented Nov. 3, 1891.
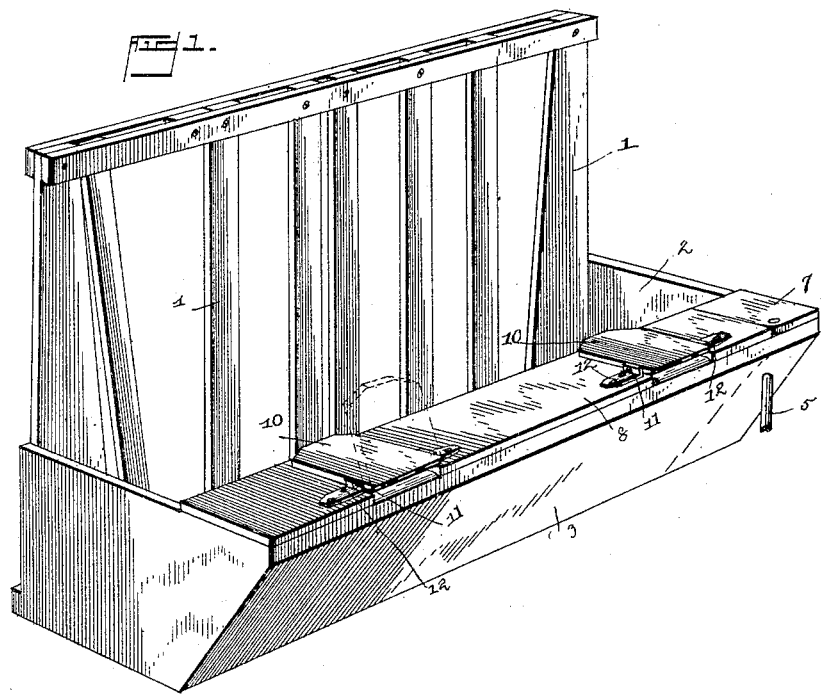
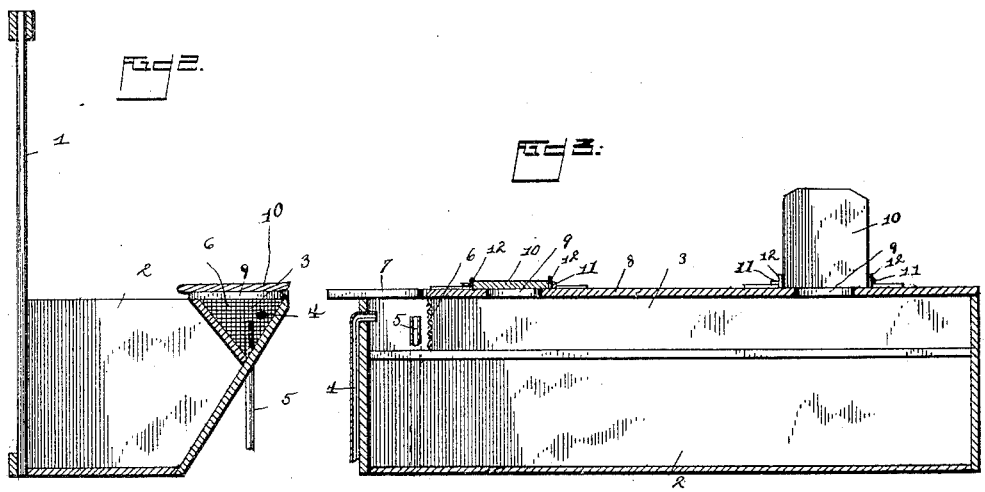
Witnesses
Chas. A. Ford.
N. J. Riley
Inventor
Burton B. Georgia.
By his Attorneys,
C. A. Snow & Co.

UNITED STATES PATENT OFFICE.

BURTON B. GEORGIA, OF CROTON, NEW YORK.

FEED-TROUGH.

SPECIFICATION forming part of Letters Patent No. 462,251, dated November 3, 1891.

Application filed July 14, 1891. Serial No. 399,483. (No model.)

*To all whom it may concern:*

Be it known that I, BURTON B. GEORGIA, a citizen of the United States, residing at Croton, in the county of Delaware and State of New York, have invented a new and useful Trough, of which the following is a specification.

The invention relates to improvements in watering-troughs for stock.

The object of the present invention is to provide for cattle a watering-trough which will be always full of fresh water and which will be within easy reach of cattle, and will, when not in actual use by cattle, be covered.

The invention consists in the construction and novel combination and arrangement of parts hereinafter fully described, illustrated in the accompanying drawings, and pointed out in the claim hereto appended.

In the drawings, Figure 1 is a perspective view of a watering-trough constructed in accordance with this invention. Fig. 2 is a transverse sectional view. Fig. 3 is a longitudinal sectional view.

Referring to the accompanying drawings, 1 designates a cattle-stanchion arranged in front of a manger or feed-trough 2, and at the head of the latter and extending longitudinally of the same is a watering-trough 3, which is constructed of any suitable material and is arranged within easy reach of cattle, and is designed to be supplied with running water, so that cattle, especially cows, may have a continual supply of fresh water near at hand.

The water-trough 3 may be of any desired shape, but is preferably V-shaped in cross-section and receives water at one end from a supply-pipe 4, and it empties by means of an overflow-pipe 5, which is prevented from clogging by a transverse foraminous partition or strainer 6, extending across the water-trough. The overflow-pipe 5 is preferably arranged, as illustrated in the accompanying drawings, at one end of the trough, and the strainer 6 forms a chamber or compartment, from which dirt and other matter which might clog the overflow-pipe is excluded, and this chamber or portion having the overflow-pipe is closed at the top by a pivoted cover 7. The rest of the watering-trough has secured to it a top 8, which is provided with a series of openings 9 to permit access of the animal to the contents of the trough. The openings 9 are normally covered and kept free from dust and dirt, and covers 10 are arranged over the openings, and they have their ends adjacent to the head of the trough hinged by pintles 11 between plates 12, which have their inner ends perforated and bent upward to form ears to receive the pintles. By this construction animals are enabled to raise the covers and obtain what water they need, and the covers will then drop back by their own weight.

It will be seen that the trough is simple and inexpensive in construction and is arranged within easy reach of cattle, and is adapted to hold a continual supply of fresh water and to give cattle free access to the same, and that when the trough is not in actual use by cattle it is closed and its contents are protected from dust and dirt.

The trough may be supplied with water from any suitable source, such as a tank or a dairyman's vat, or means may be provided for automatically supplying water as cattle drink it.

By using troughs constructed in accordance with this invention cows do not have to be turned out in cold weather and drink ice-water and become chilled, but may be left from four to six weeks at a time in a stable, where they do much better. Then there is no danger of slipping on ice or hooking one another, all the fertilizer is saved, there is about thirty per cent. less labor in caring for them, it requires less feed, and they are perfectly contented, and do much better, as they drink little and often.

What I claim is—

A watering-trough arranged on one side of a stanchion at the head of a feed-trough and extending longitudinally of and within the latter, said trough being provided with a top having a series of openings 9 and a pivoted cover 7, forming a continuation of the top, combined with covers 10, hinged each at one end at the head of the trough and projecting slightly beyond the top and adapted to be raised by the nose of an animal and to drop back by their own weight, a supply-pipe, an overflow-pipe, and a strainer for the overflow-pipe, substantially as described.

In testimony that I claim the foregoing as my own I have hereto affixed my signature in presence of two witnesses.

BURTON B. GEORGIA.

Witnesses:
A. F. GEORGIA,
D. N. GEORGIA.